No. 720,541. PATENTED FEB. 10, 1903.
H. A. WENDE.
CHIME RINGING DEVICE.
APPLICATION FILED AUG. 1, 1901.
NO MODEL. 3 SHEETS—SHEET 1.

WITNESSES:
Edward Thorpe
C. R. Ferguson

INVENTOR
Hermann A. Wende
BY
Munn
ATTORNEYS

No. 720,541. PATENTED FEB. 10, 1903.
H. A. WENDE.
CHIME RINGING DEVICE.
APPLICATION FILED AUG. 1, 1901.
NO MODEL. 3 SHEETS—SHEET 2.
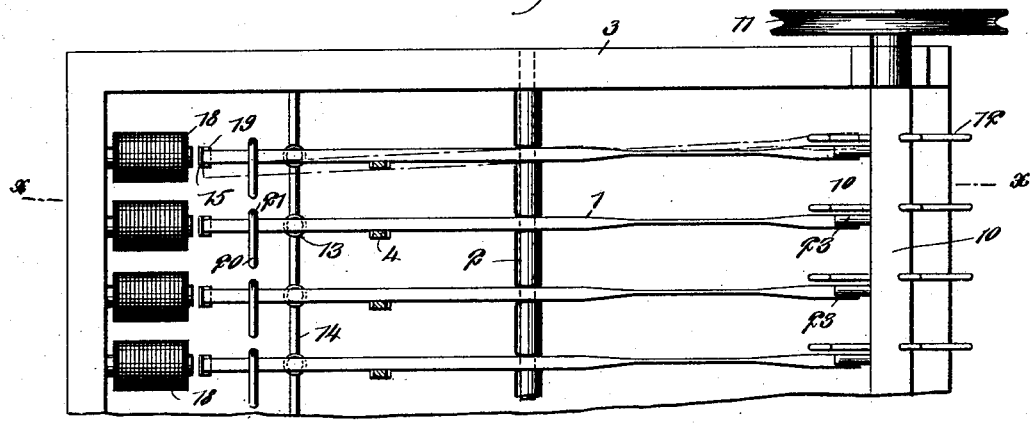
Fig. 2.
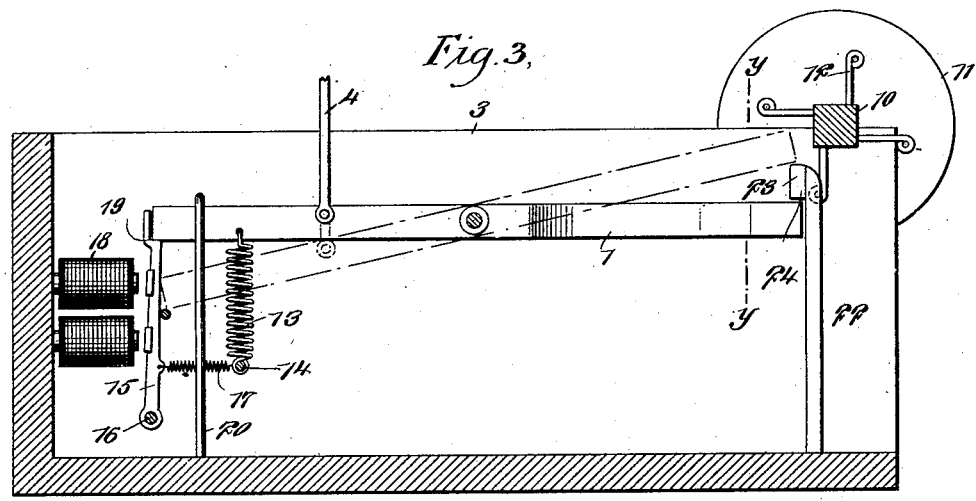
Fig. 3.
Fig. 4. Fig. 5.
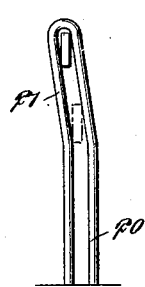
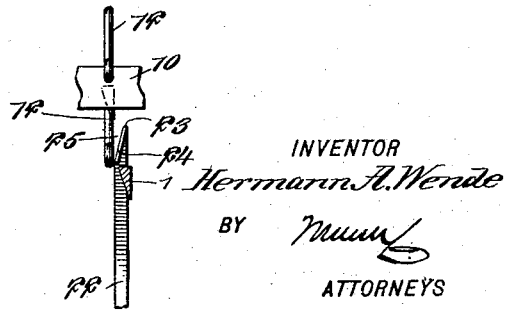
WITNESSES:
Edward Thorpe
C. R. Ferguson
INVENTOR
Hermann A. Wende
BY
Munn
ATTORNEYS

UNITED STATES PATENT OFFICE.

HERMANN ALBERT WENDE, OF BUFFALO, NEW YORK.

CHIME-RINGING DEVICE.

SPECIFICATION forming part of Letters Patent No. 720,541, dated February 10, 1903.

Application filed August 1, 1901. Serial No. 70,482. (No model.)

*To all whom it may concern:*

Be it known that I, HERMANN ALBERT WENDE, a citizen of the United States, and a resident of Buffalo, in the county of Erie and State of New York, have invented a new and Improved Chime-Ringing Device, of which the following is a full, clear, and exact description.

This invention relates to improvements in devices for ringing or controlling the ringing of a chime of bells; and the object is to provide a simple electrically-released hammer-actuating mechanism which may be located close to the bells, and other objects will appear in the general description.

I will describe a chime-ringing device embodying my invention and then point out the novel features in the appended claims.

Reference is to be had to the accompanying drawings, forming a part of this specification, in which similar characters of reference indicate corresponding parts in all the views.

Figure 1:
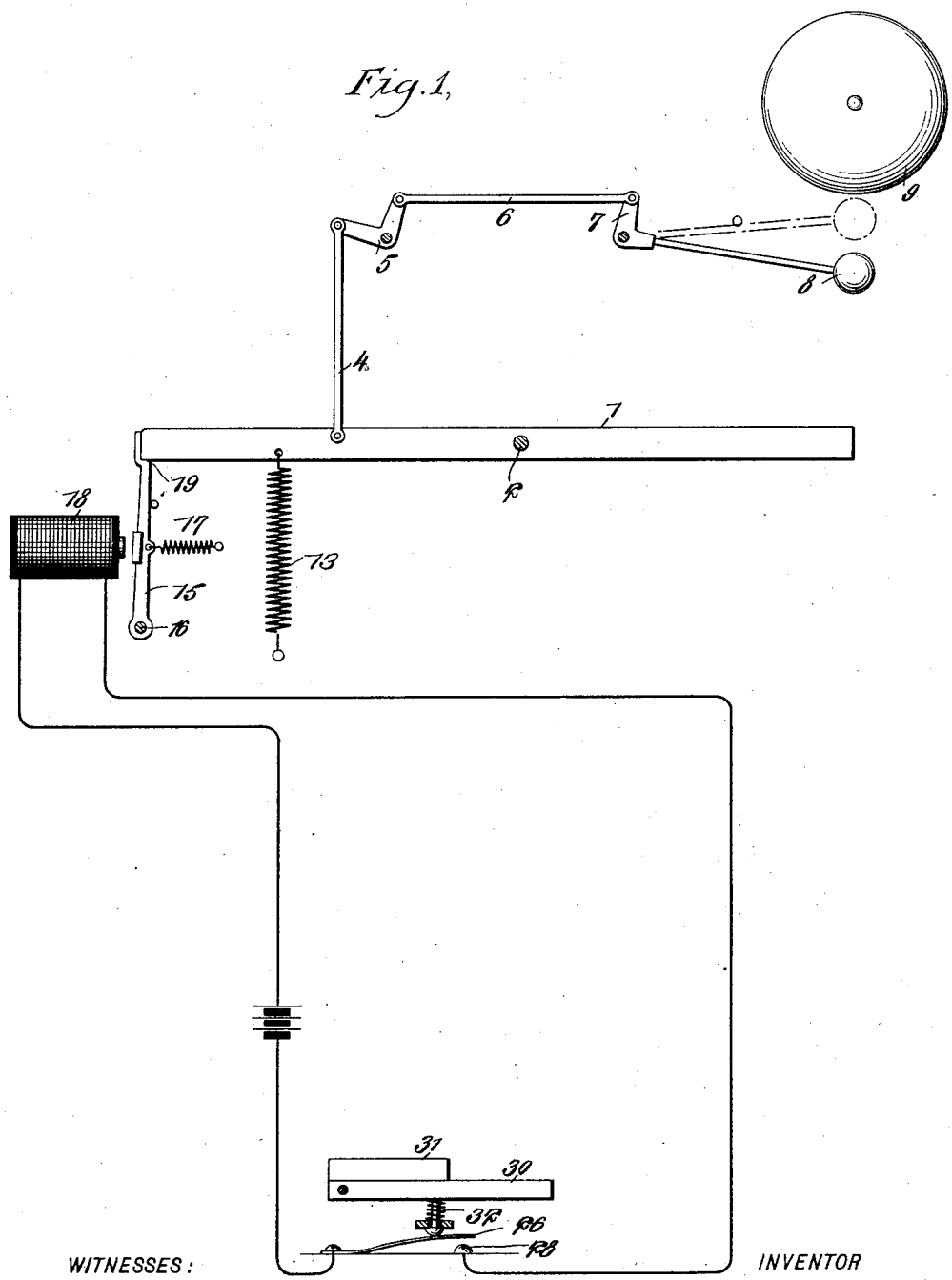
Figure 6:
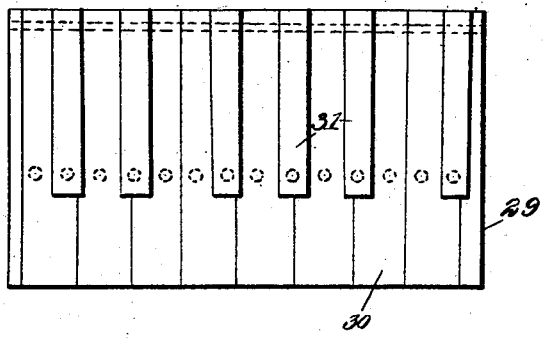
Figure 7:
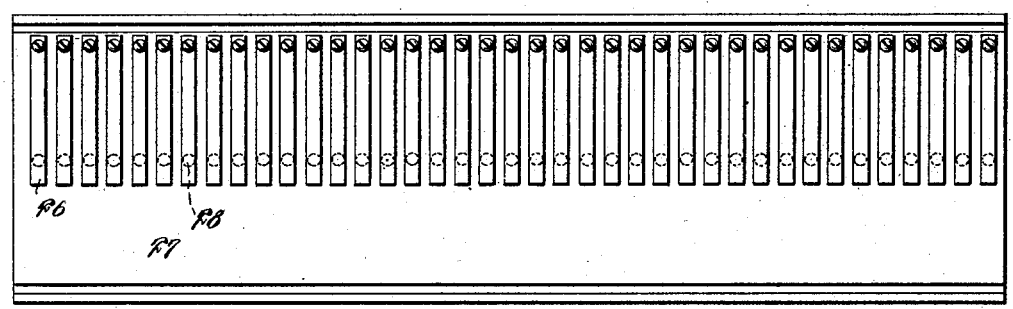
Figure 8:
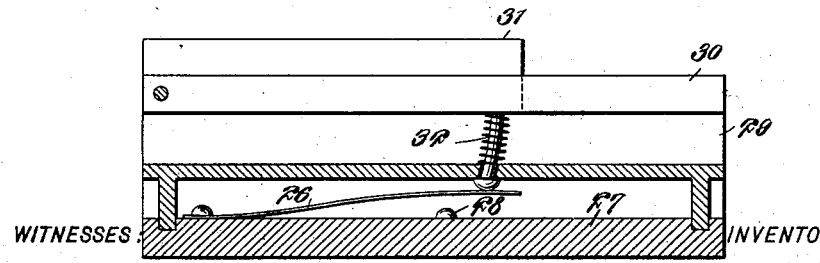

Figure 1 is a diagrammatic view showing a chime-ringing mechanism embodying my invention. Fig. 2 is a plan view showing actuating-levers employed and the releasing devices therefor. Fig. 3 is a section on the line *x x* of Fig. 2. Fig. 4 shows one of the lever-guides employed. Fig. 5 is a section on the line *y y* of Fig. 3. Fig. 6 is a plan view of the keyboard. Fig. 7 is a plan view of the circuit-closers employed; and Fig. 8 is a cross-sectional view with the keyboard thereon, also in section.

The mechanism comprises a series of levers 1, mounted to rock on a shaft 2 and also having a slight lateral movement on said shaft, this shaft being supported in a frame 3, which may be placed at any desired location or underneath the chime of bells. It will be understood that a lever 1 will be provided for each bell or the hammer thereof.

From each lever 1 a transmission or draw rod 4 extends to a connection with one arm of an angle-lever 5, from the other end of which a link 6 extends to a connection with one member of an angle-lever 7, on the other section of which is mounted a bell-hammer 8, designed to strike its bell 9. Arranged to rotate in the frame 3 is a tappet-carrying shaft 10, which is kept in constant rotation during the ringing of the chimes by means of a suitable motor having connection with the band-wheel 11 on said shaft. Arranged on the shaft are tappet-arms 12, there being a series of such tappet-arms arranged in a circular row for operating in connection with each lever 1, as will be hereinafter described.

From the forward end of each lever 1 an actuating-spring 13 extends downward to a connection with a fixed rod 14 in the frame 3, and each lever 1 is locked in inoperative position by means of an armature-lever 15, the several armature-levers being mounted to swing on a rod 16, and these armature-levers are held in engagement with the actuating-levers 1 by means of springs 17. The armatures on the armature-levers coact with electromagnets 18. Each armature-lever 15 at its upper end is provided with a shoulder 19, which prevents the actuating-lever from moving too far downward when engaged with said armature-lever.

Extended upward from the bottom of the frame 3 are guides 20 for the actuating-levers. These guides are made in the form of loops, and the upper portions thereof are inclined laterally, as indicated at 21 in Fig. 4. These lateral inclines are designed to swing the forward ends of the levers 1 into engagement with the armature-levers, and it will be noted that when said forward ends swing downward under the impulse of the spring 13 the end of the actuating-lever will be moved to a line at one side of the armature-lever, so that when the circuit is opened through the electromagnet the said armature-lever in its backward movement will not contact or engage with the end of the actuating-lever, thus preventing its possible operation.

Extended upward from the bottom of the frame 3 and slightly forward of the shaft 10 are deflecting-posts 22. At the upper end of each deflecting-post is a projection 23, the side 24 of which is inclined upward and laterally, the upper end being directed away from the line of movement of the tappet-arms 12. The opposite side 25 of this projection is inclined downwardly and laterally, the lower end being directed toward the line of movement of said tappet-arms 12.

In the operation of the device as so far described when an electromagnet is energized by closing the circuit by a key mechanism its armature-lever will be moved toward the magnet, thus releasing its actuating-lever 1. The forward end of the actuating-lever will then be moved downward by its spring 13, causing the throw of the bell-hammer. During this movement the rear end of the actuating-lever will move upward and engage against the inclined side 24 of the projection 23 and move up and over the top of the same, and the slight resiliency of the actuating-lever will cause its rear end to spring over to the opposite side 25 of said projection and into the line of movement of the tappet-arm 12. One of said tappet-arms therefore will engage with the actuating-lever, moving its rear end downward, and consequently its front end portion upward, where it will be again engaged by the locking device or armature-lever. When the rear end of the lever 1 passes down below the projection 23, it will again spring back to the opposite side of said projection, and consequently out of the line of movement of the tappet-arm.

Arranged at any suitable place is a circuit-controlling device comprising a series of spring-contacts 26, arranged on a board 27. The several electromagnets 18 are connected at one end to these spring-contacts, while the other ends of the electromagnets are connected with contact-points 28, arranged on said board 27. It may be here stated, however, that the several electromagnets may have one end connection with all of the spring-contacts 26. Mounted to move on the board 27 is a keyboard 29, and arranged on the keyboard are the actuating-keys 30 and 31, the long keys 30 representing the full tones, while the short keys 31 are for the sharps and flats. From the several keys fingers 32 extend downward for engaging with the circuit-closers 26. It will be noted that the keys on the keyboard represent a scale, and by moving the keyboard along the circuit-controller board changes in the scale may be quickly made as desired.

With this mechanism the blow at a chime is instantly delivered and cannot be recovered; but the actuating-lever is immediately reset and is again ready for operation at the will of the operator. In this machine after installation no adjustments are required and there are no parts to become worn or loose. The device requires no closing or opening of a high-pressure electric current in a belfry or tower. Consequently there is no danger of fire caused by the dangerous arc of such high electric-power currents.

Having thus described my invention, I claim as new and desire to secure by Letters Patent—

1. In a chime-ringing mechanism, a series of independent actuating-levers having connection with chime-strikers, electrically-controlled locking and releasing mechanism for said levers, a tappet-shaft, tappet-arms carried by said shaft, and means for moving the ends of the actuating-levers laterally into the line of movement of said tappet-arms, substantially as specified.

2. In a chime-ringing mechanism, a series of independent actuating-levers, an armature-lever for each actuating-lever, for locking the same in withdrawn position, an electromagnet for releasing the armature-lever from the actuating-lever, a guide for the actuating-lever arranged to move the end of said actuating-lever into engagement with the armature-lever, springs for moving the actuating-levers in one direction, and means for moving the actuating-levers to the original position, substantially as specified.

3. In a chime-ringing mechanism, a series of actuating-levers, connections between said actuating-levers and bell-strikers, springs for moving the actuating-levers in one direction, electrically-controlled locking devices for the actuating-levers, deflecting-posts at one end of the actuating-levers, projections on the upper ends of said posts, the opposite sides of said projections being inclined in opposite directions, a tappet-shaft, and tappet-arms carried by said shaft, there being a series of tappet-arms for each actuating-lever, substantially as specified.

4. In a chime-ringing mechanism, a series of actuating-levers, locking devices for the levers, electromagnets for releasing said locking devices, a circuit-controller comprising a series of spring-contacts, and a series of coacting contact-points, the said spring-contacts and contact-points being in connection with the electromagnets, and a keyboard movable over the said contacts, substantially as specified.

5. In a chime-ringing mechanism, actuating-levers, locking devices for the levers, electromagnets for releasing the locking devices, a series of circuit-closing devices having connection with the electromagnets, a keyboard mounted to slide over the circuit-closing devices, keys on said keyboards, and fingers extended from the keys for engaging or operating the circuit-closing devices, substantially as specified.

In testimony whereof I have signed my name to this specification in the presence of two subscribing witnesses.

HERMANN ALBERT WENDE.

Witnesses:
ANNA C. S. WENDE,
EDUARD RICHTER.